United States Patent
Mergener

(10) Patent No.: US 8,651,223 B2
(45) Date of Patent: Feb. 18, 2014

(54) SYNCHRONIZING SYSTEM FOR HYDRAULIC FOUR WHEEL STEERING

(75) Inventor: Travis S. Mergener, Horicon, WI (US)

(73) Assignee: Deere & Company, Moline, IL (US)

( * ) Notice: Subject to any disclaimer, the term of this patent is extended or adjusted under 35 U.S.C. 154(b) by 72 days.

(21) Appl. No.: 13/284,179

(22) Filed: Oct. 28, 2011

(65) Prior Publication Data

US 2013/0105242 A1    May 2, 2013

(51) Int. Cl.
*B62D 5/08* (2006.01)
(52) U.S. Cl.
USPC .............................. 180/414; 280/98; 280/103
(58) Field of Classification Search
USPC ............ 180/140, 141, 142, 414; 280/91, 701, 280/96, 98, 99, 103
See application file for complete search history.

(56) References Cited

U.S. PATENT DOCUMENTS

| | | | |
|---|---|---|---|
| 4,776,418 A | | 10/1988 | Winckler et al. |
| 5,174,595 A | * | 12/1992 | Snipes .......................... 180/411 |
| 5,489,006 A | * | 2/1996 | Saiia et al. .................... 180/423 |
| 5,758,740 A | * | 6/1998 | Park .............................. 180/442 |
| 5,839,527 A | * | 11/1998 | Elser et al. ................. 180/24.01 |
| 6,131,689 A | | 10/2000 | Nodorft et al. |
| 6,684,974 B1 | | 2/2004 | Ulschmid |

* cited by examiner

*Primary Examiner* — Tony Winner
*Assistant Examiner* — Jacob Knutson

(57) ABSTRACT

A synchronizing system for hydraulic four wheel steering includes double acting front and rear steering cylinders. The front and rear steering cylinders are moveable between retracted and extended positions in response to the position of a power steering valve. A synchronizing valve assembly is connected by hydraulic lines between the front and the rear steering cylinders, and includes a first directional relief valve that opens in response to hydraulic fluid pressure to synchronize both steering cylinders in a full left turn position, and a second directional relief valve that opens in response to hydraulic fluid pressure to synchronize both steering cylinders in a full right turn position.

14 Claims, 5 Drawing Sheets

SYNCHRONIZING SYSTEM FOR HYDRAULIC FOUR WHEEL STEERING

FIELD OF THE INVENTION

The present invention relates to lawn and garden tractors and other off road vehicles having hydraulic four wheel steering, and specifically to synchronizing the steering angles of the front and rear wheels.

BACKGROUND OF THE INVENTION

Lawn and garden tractors and other off road vehicles may be equipped with mechanical four wheel steering systems having linkages extending between the front and rear wheel steering assemblies. Examples of mechanical four wheel steering systems are shown in U.S. Pat. Nos. 6,131,689 and 6,684,974. Disadvantages of mechanical four wheel steering systems include their additional weight and cost. Mechanical four wheel steering systems also require space under the tractor frame that otherwise might be needed for high capacity mower decks.

Hydraulic four wheel steering systems also have been proposed for lawn and garden tractors and other off road vehicles in order to reduce the weight and number of parts, save cost, and allow for higher capacity mower decks. However, hydraulic four wheel steering systems have steering angles that may become misaligned between the front and rear wheels.

Position sensors and electronic positioning devices have been proposed to align or synchronize the front and rear wheels of lawn and garden tractors and other off road vehicles. However, there is a need for synchronizing system for hydraulic four wheel steering that does not require or include position sensors or electronic positioning devices, and provides a low cost and less complex system to synchronize hydraulic four wheel steering of a lawn and garden tractor or other off road vehicle.

SUMMARY OF THE INVENTION

A synchronizing system for hydraulic four wheel steering includes a double acting front steering cylinder mounted between a stationary member and a front wheel support assembly, and a double acting rear steering cylinder mounted between a stationary member and a rear wheel support assembly. A synchronizing valve assembly may be connected by hydraulic lines between the front and the rear steering cylinders, with a pair of normally closed directional relief valves that can open to synchronize the positions of the front and the rear steering cylinders.

DESCRIPTION OF THE PREFERRED EMBODIMENT

Figure 1:
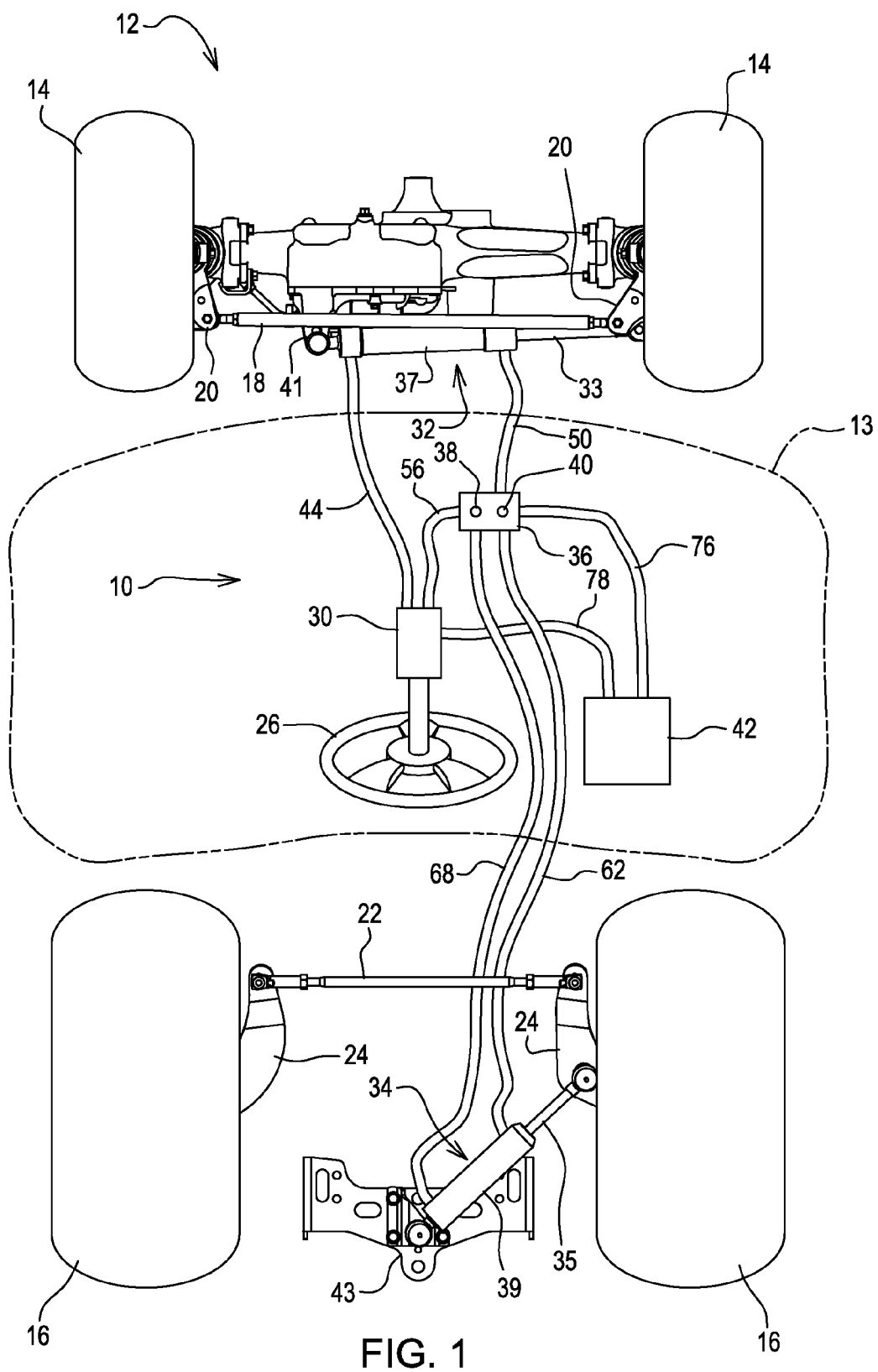
FIG. 1 is a bottom view of a synchronizing system for hydraulic four wheel steering according to a first embodiment of the invention.

In one embodiment shown in FIGS. 1-5, synchronizing system 10 for hydraulic four wheel steering may be used on off road vehicles such as lawn and garden tractor 12, mowers or other utility vehicles. Mower deck 13 within which a cutting blade may be rotated to cut grass or other vegetation may be suspended by the vehicle between the front wheels and tires 14, and the rear wheels and tires 16. The synchronizing system may be particularly advantageous for use on lawn and garden tractors that carry mid-mounted mower decks between the front and rear wheels. Additionally, the synchronizing system may be advantageous for lawn and garden tractors and similar vehicles having four wheel traction drive. The system also may be used on vehicles without mid-mounted mower decks or two wheel drive vehicles. Left and right front wheels 14 may be connected together by tie rod 18 linking between left and right front pivotal wheel support assemblies 20, and the left and right rear wheels 16 may be connected together by tie rod 22 linking between left and right rear pivotal wheel support assemblies 24.

In one embodiment, lawn and garden tractor 12 may include steering wheel 26 operably connected to power steering unit 27. The power steering unit may include power steering directional spool valve 28 that may be moved by steering wheel 26 between a right turn position where the front wheels and rear wheels are turned to the right, and a left turn position where the front wheels and rear wheels are turned to the left. The power steering unit also may include steering valve directional pump 29 and high or increased pressure line 30 connecting power steering valve 28 to pump 29. Lines 21, 23 and 25 may connect valve 28 to tank or reservoir 78, a hydraulic pump (not shown), and a bypass to auxiliary hydraulics (not shown).

In one embodiment, the synchronizing system may include a pair of double acting or two-way steering cylinders 32, 34 and hydraulic lines forming a closed loop from power steering pump 30 through steering cylinders 32, 34 back to the pump. Power steering valve 28 may drive either of front steering cylinder 32 or rear steering cylinder 34, with one cylinder being the master and the other cylinder being the slave. Each steering cylinder may be a piston-type double acting cylinder having a movable piston or rod 33, 35 and a cylinder housing or barrel 37, 39. The piston or rod may be attached to the wheel support assembly, while the housing or barrel of the cylinder may be mounted to a stationary frame or axle member 41, 43 of the vehicle between the pair of front and rear wheels, or vice versa. Each of the steering cylinders may provide mechanical stops that may be reached when the front and rear wheels are fully turned to the right or the left.

In one embodiment, the turning angle of each front tire and wheel may be between about 5 degrees and about 20 degrees greater than the turning angle of each rear tire and wheel. For each front wheel to have a greater turning angle, front steering cylinder 32 may have a longer stroke than rear steering cylinder 34 between the fully extended position and fully retracted position. For example, the stroke of the front steering cylinder may between about 50% and about 100% longer than the stroke of the rear steering cylinder. Additionally, the displacement of the front steering cylinder bore and annulus may be larger than the rear steering cylinder bore and annulus. For example, the front steering cylinder bore and annulus may be between about 10% and about 40% larger in displacement than the rear steering cylinder bore and annulus.

In one embodiment, the synchronizing system may include synchronizing valve assembly 36 having first and second directional relief valves 38, 40 preferably positioned in a manifold. First directional relief valve 38 may dump hydraulic fluid into the loop if there is insufficient hydraulic fluid between the front and rear steering cylinders for the cylinders to be synchronized. Second directional relief valve 40 may dump hydraulic fluid to tank or reservoir 42 if there is excess fluid between the front and rear steering cylinders for the cylinders to be synchronized. Both directional relief valves 38 and 40 are normally closed and may be spring biased to a closed position, and may open in response to hydraulic pressure in line exceeding a predetermined value such as 850 psi.

In one embodiment, front primary steering line 44 may connect port 46 of power steering unit 27 to bore 48 of front steering cylinder 32. Front secondary steering line 50 may connect annulus 52 of front steering cylinder 32 to port 54 of synchronizing valve assembly 36. Rear primary steering line 56 may connect port 58 of power steering valve 28 to port 60 of synchronizing valve assembly 36. Rear steering valve line 62 may connect port 64 of synchronizing valve assembly 36 to annulus 66 of rear steering cylinder 34. Rear secondary steering line 68 may connect bore 70 of rear steering cylinder 34 to port 72 of synchronizing valve assembly 36.

In one embodiment, synchronizing valve assembly 36 may include a manifold having internal passages connecting ports 60 and 64 to the inlet of first directional relief valve 38. Additional passages in the synchronizing valve assembly manifold may connect ports 54 and 72 and the outlet of first directional relief valve 38 to the inlet of second directional relief valve 40. The synchronizing valve assembly also may include a passage connecting the outlet of second directional relief valve 40 and port 74. Cooling return line 76 may connect port 74 to tank 42.

Figure 2:
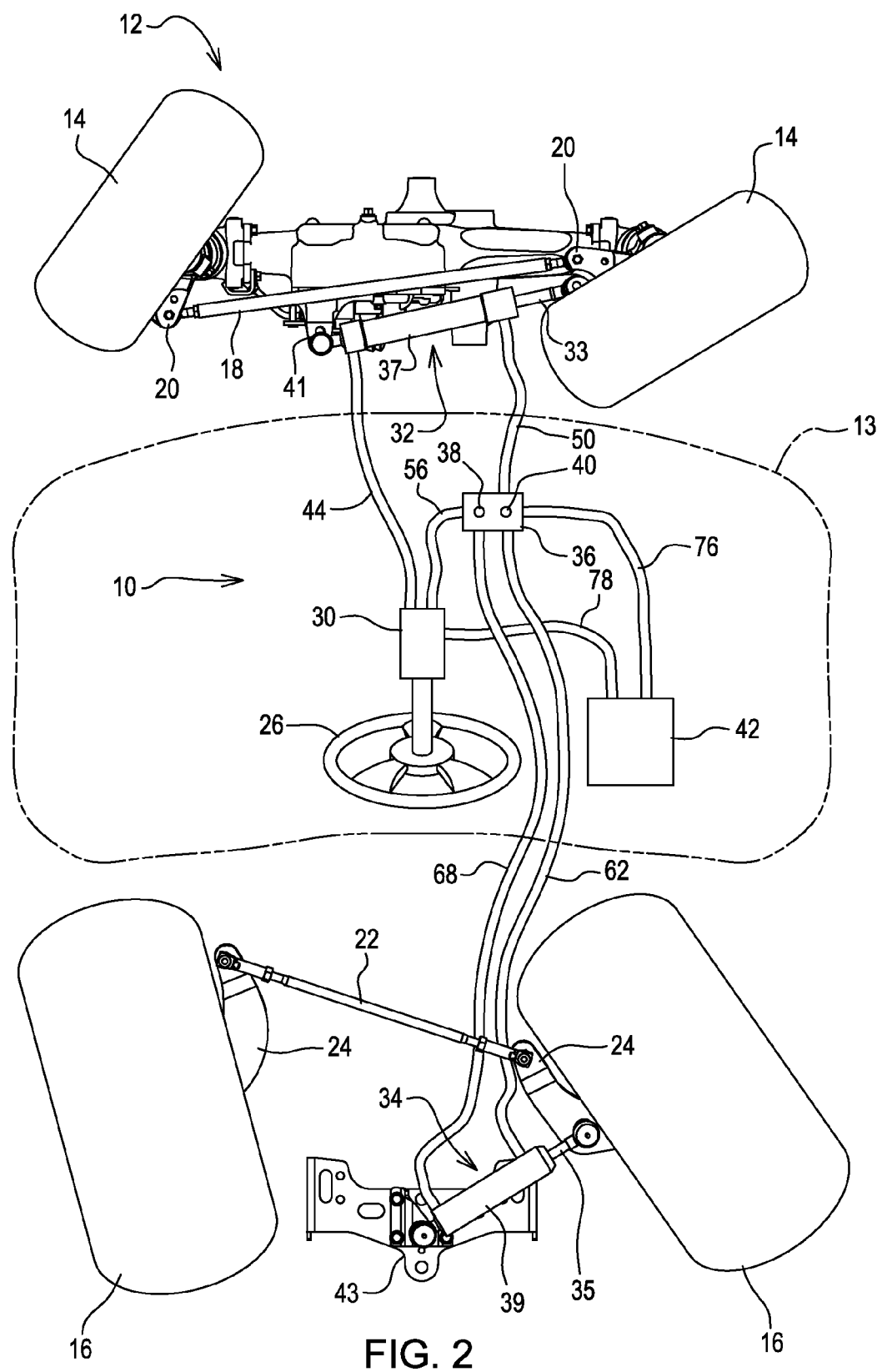
FIG. 2 is a bottom view of a synchronizing system for hydraulic four wheel steering according to a first embodiment of the invention, with the wheels fully turned to the left.
Figure 4:
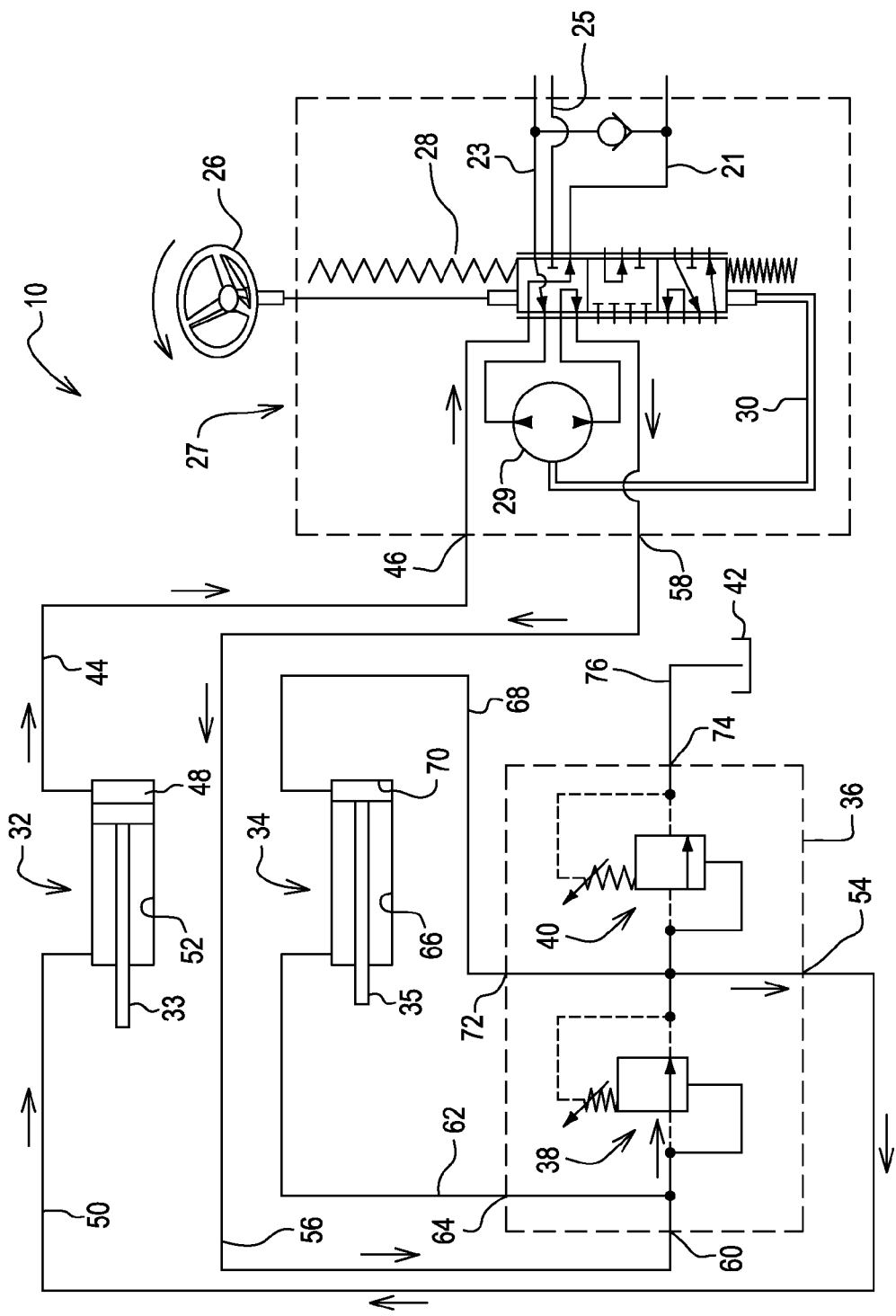
FIG. 4 is a schematic drawing of a synchronizing system for hydraulic four wheel steering according to a first embodiment of the invention, with the first directional relief valve open to synchronize both steering cylinders in fully retracted positions.

FIGS. 2 and 4 show an embodiment of synchronizing system 10 where steering wheel 26 and front and rear wheels 14, 16 are turned to the left. Turning the steering wheel to the left opens power steering valve 28 from power steering pump 30 to rear primary steering line 56. Rear primary steering line 56 may be connected to port 60 of synchronizing valve assembly 36. Passages in synchronizing valve assembly 36 may connect port 60 to port 64. Rear steering valve line 62 may connect port 64 of synchronizing valve assembly 36 to annulus 66 of rear steering cylinder 34. Hydraulic fluid pressure in annulus 66 forces rear steering cylinder 34 to retract. As rear steering cylinder 34 retracts, hydraulic fluid may be forced out the opposite end or bore 70 of rear steering cylinder 34. Rear secondary steering line 68 may connect bore 70 to port 72 of synchronizing valve assembly 36. Passages in synchronizing valve assembly 36 may connect port 72 to port 54. Front secondary steering line 50 may connect port 54 of synchronizing valve assembly 36 to annulus 52 of front steering cylinder 32. Hydraulic fluid pressure in annulus 52 forces front steering cylinder 32 to retract. As front steering cylinder 32 retracts, hydraulic fluid may be forced out the bore 48 of front steering cylinder 32. Front primary steering line 44 may connect bore 48 to port 46 of power steering valve 27, which may be connected by line 21 to tank 42.

In one embodiment, if rear steering cylinder 34 is completely retracted and reaches a stop before front steering cylinder 32 is completely retracted, the synchronizing system may be used to continue retracting front steering cylinder 32. As shown in FIG. 4, steering wheel 26 may be turned fully to the left and held in the full left turn position for at least about five seconds and preferably between at least about ten seconds and about fifteen seconds. As a result, hydraulic fluid pressure in rear primary steering line 60 may become sufficiently high to open first directional relief valve 38. First directional relief valve 38 connects between ports 60 and 54. Front secondary steering line 50 may be connected between port 54 and annulus 52 of front steering cylinder 32. First directional relief valve 38 may dump hydraulic fluid into the loop because there is insufficient hydraulic fluid between the front and rear steering cylinders for the cylinders to be synchronized. While the steering wheel continues to be held in a full left turn position, front steering cylinder 32 continues retracting until reaching a stop at which time the front and rear wheels may be synchronized in a left turn position.

Figure 3:
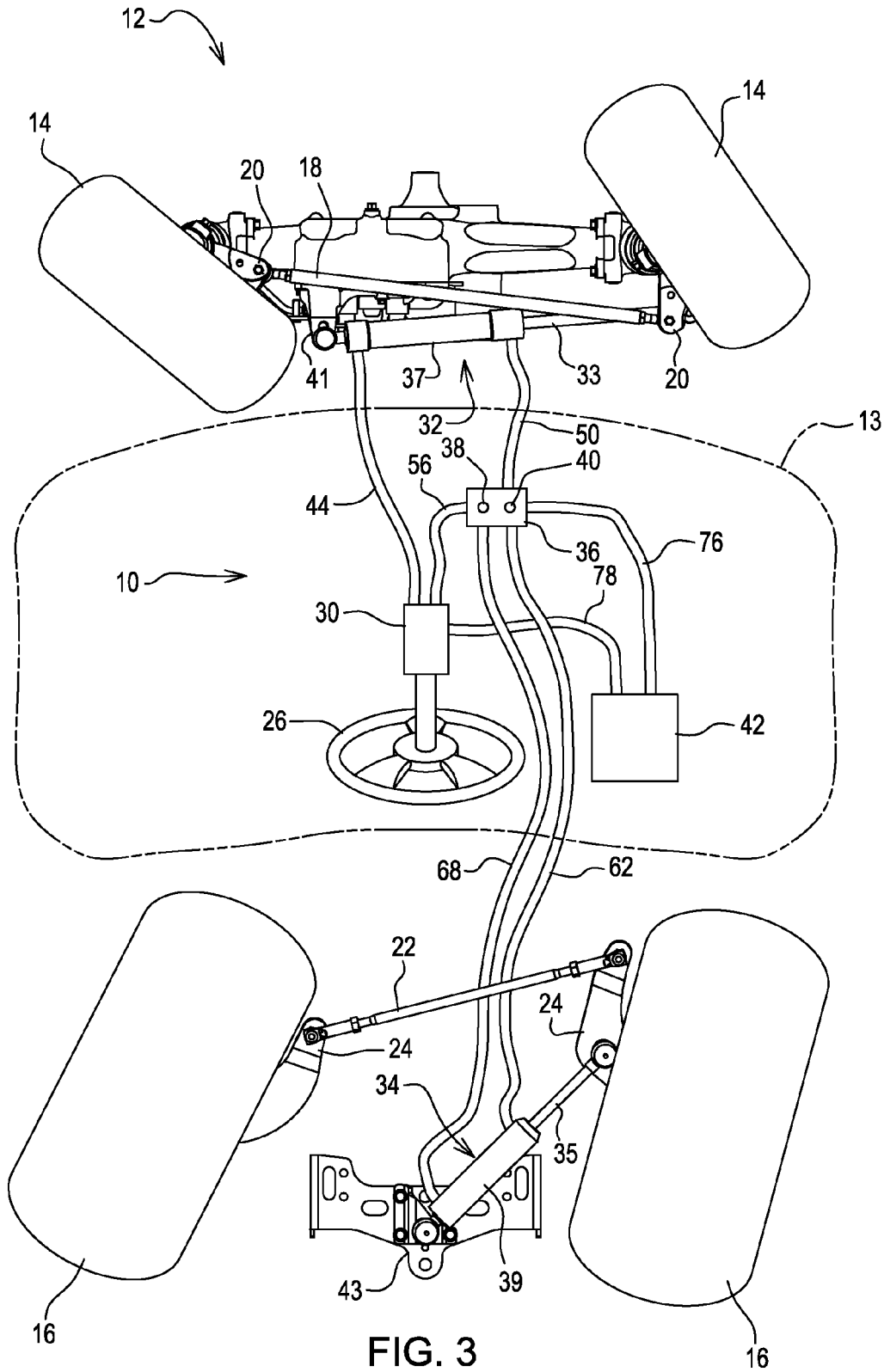
FIG. 3 is a bottom view of a synchronizing system for hydraulic four wheel steering according to a first embodiment of the invention, with the wheels fully turned to the right.
Figure 5:
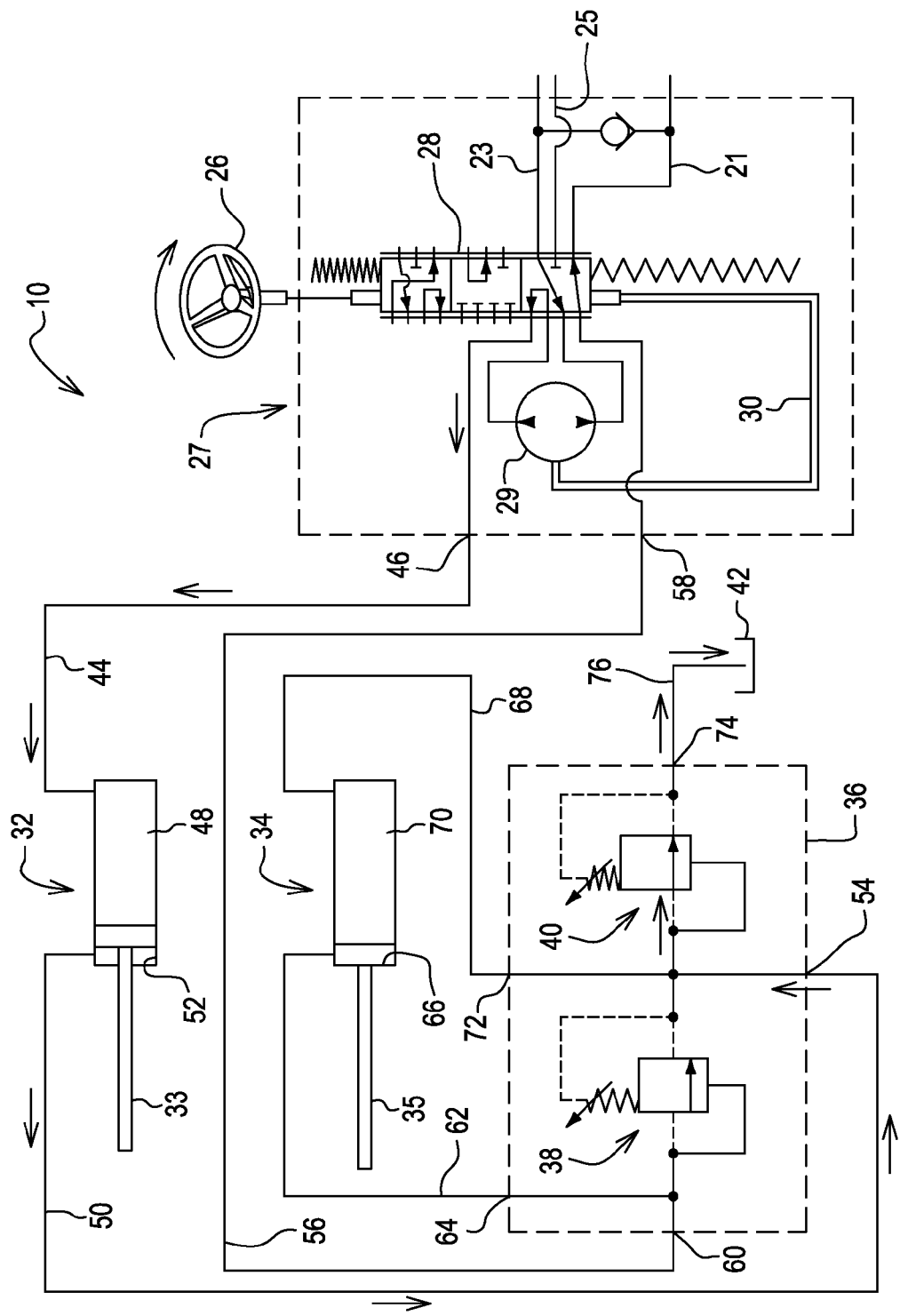
FIG. 5 is a schematic drawing of a synchronizing system for hydraulic four wheel steering according to a first embodiment of the invention, with the second directional relief valve open to synchronize both steering cylinders in fully extended positions.

FIGS. 3 and 5 show an embodiment of synchronizing system 10 where steering wheel 26 and the front and rear wheels 14, 16 are turned to the right. Turning the steering wheel to right left opens power steering valve 28 from power steering pump 30 to front primary steering line 44. Front primary steering line 44 may be connected to bore 48 of front steering cylinder 32. Hydraulic fluid pressure in bore 48 forces front steering cylinder 32 to extend. As front steering cylinder 32 extends, hydraulic fluid may be forced out annulus 52 of front steering cylinder 32. Front secondary steering line 50 may connect annulus 52 to port 54 of synchronizing valve assembly 36. Passages in synchronizing valve assembly 36 may connect port 54 to port 72. Rear secondary steering line 68 may connect port 72 of synchronizing valve assembly 36 to bore 70 of rear steering cylinder 34. Hydraulic fluid pressure in bore 70 forces rear steering cylinder 34 to extend. As rear steering cylinder 34 extends, hydraulic fluid may be forced out the opposite end or annulus 66 of rear steering cylinder 34. Rear steering valve line 62 may connect annulus 66 to port 64 of synchronizing valve assembly 36. Passages in synchronizing valve assembly 36 may connect port 64 to port 60. Rear steering valve line 56 may connect port 60 of synchronizing valve assembly 36 to port 58 of power steering unit 27, which may be connected by line 21 to tank 42.

In one embodiment, if rear steering cylinder 34 is completely extended and reaches a stop before front steering cylinder 32 is completely extended, the synchronizing system may be used to continue extending front steering cylinder 32. As shown in FIG. 5, steering wheel 26 may be turned fully to the right and held in the full right turn position for at least about five seconds and preferably between at least about ten seconds and about fifteen seconds. As a result, hydraulic fluid pressure in front secondary steering line 50 may become sufficiently high to open second directional relief valve 40. Second directional relief valve 40 connects between ports 54 and 74. Cooling return line 76 may connect port 74 to tank 42. Second directional relief valve 40 may dump hydraulic fluid to tank or reservoir 42 because there is excess fluid between the front and rear steering cylinders for the cylinders to be synchronized. While the steering wheel continues to be held in a full right turn position, front steering cylinder 32 continues extending until reaching a stop at which time the front and rear wheels may be synchronized in a right turn position.

In one embodiment, if front steering cylinder 32 is completely retracted or extended and reaches a stop before rear steering cylinder 34 is completely retracted or extended, the synchronizing system also may be used to continue retracting or extending rear steering cylinder 34. While the steering wheel continues to be held in a full left turn or right turn position, the front steering cylinder or rear steering cylinder may continue retracting or extending until reaching a stop at which time the front and rear wheels may be synchronized in a left turn or right turn position. In a preferred embodiment, the front and rear steering cylinders may be retracted when turning the wheels to the left and extended when turning the wheels to the right, but the synchronizing system also may have the front and rear steering cylinders extended when turning the wheels to the left and retracted when turning the wheels to the right.

Having described the preferred embodiment, it will become apparent that various modifications can be made without departing from the scope of the invention as defined in the accompanying claims.

I claim:

1. A synchronizing system for hydraulic four wheel steering comprising:
    a power steering valve operably connected to a steering wheel that may be turned to move the power steering valve between a full left turn position and a full right turn position;
    a double acting front steering cylinder and a double acting rear steering cylinder, each of the front and the rear steering cylinders connected by hydraulic lines to the power steering valve and moveable between a retracted position and an extended position in response to the position of the power steering valve; and
    a synchronizing valve assembly connected by hydraulic lines between the front and the rear steering cylinders, the synchronizing valve assembly including a first directional relief valve that opens in response to insufficient hydraulic fluid between the front and rear steering cylinders to dump hydraulic fluid into the hydraulic lines between the front and rear steering cylinders to synchronize the front and the rear steering cylinders in the full left turn position, and a second directional relief valve that opens in response to excess hydraulic fluid between the front and rear steering cylinders to dump hydraulic fluid into a reservoir to synchronize the front and the rear steering cylinders in the full right turn position.

2. The synchronizing system for hydraulic four wheel steering of claim 1 wherein the front steering cylinder has a longer stroke than the rear steering cylinder.

3. The synchronizing system for hydraulic four wheel steering of claim 1 wherein one end of each said steering cylinder is mounted to a wheel support assembly and an opposite end of each said steering cylinder is mounted to a stationary member between a pair of front wheels and pair of rear wheels of a lawn and garden tractor having a mid-mounted mower deck.

4. The synchronizing system for hydraulic four wheel steering of claim 3 wherein each of said pair of front wheels has a greater turning angle than each of said pair of rear wheels.

5. The synchronizing system for hydraulic four wheel steering of claim 1 wherein the first directional relief valve opens in response to hydraulic fluid pressure acting on the first directional relief valve if only one of the steering cylinders is fully retracted.

6. The synchronizing system for hydraulic four wheel steering of claim 1 wherein the second directional relief valve opens in response to hydraulic fluid pressure acting on the second directional relief valve if only one of the steering cylinders is fully extended.

7. A synchronizing system for hydraulic four wheel steering comprising:
    a double acting front steering cylinder mounted between a stationary member and a front wheel support assembly;
    a double acting rear steering cylinder mounted between a stationary member and a rear wheel support assembly; and
    a synchronizing valve assembly connected by hydraulic lines between the front and the rear steering cylinders, the synchronizing valve assembly having a pair of normally closed directional relief valves that can open if one of the front and the rear steering cylinders is fully extended or retracted to a stop to synchronize the positions of the front and the rear steering cylinders by dumping or releasing hydraulic fluid from the hydraulic lines between the front and the rear steering cylinders.

8. The synchronizing system for hydraulic four wheel steering of claim 7 wherein the pair of normally closed directional relief valves include a first directional relief valve that opens to synchronize both of the front and the rear steering cylinders in a fully extended position.

9. The synchronizing system for hydraulic four wheel steering of claim 7 wherein the pair of normally closed directional relief valves include a second directional relief valve that opens to synchronize both of the front and the rear steering cylinders in a fully retracted position.

10. The synchronizing system for hydraulic four wheel steering of claim 7 further comprising a steering wheel operably connected to a power steering unit connected by hydraulic lines to the front and the rear steering cylinders and the synchronizing valve assembly, the steering wheel may be turned fully in one direction to synchronize both of the front and the rear steering cylinders in an extended position, and turned fully in an opposite direction to synchronize both of the front and the rear steering cylinders in a retracted position.

11. A synchronizing system for hydraulic four wheel steering comprising:
    a pair of two-way steering cylinders connected together by hydraulic lines and to a power steering valve and pump operated by a steering wheel; and
    a pair of directional relief valves between the pair of two-way steering cylinders, the directional relief valves opening to dump hydraulic fluid into the hydraulic lines between the pair of two-way steering cylinders if the pair of two-way steering cylinders are not synchronized together in a fully extended position while the steering wheel is turned fully in one direction, or opening to dump hydraulic fluid from the hydraulic lines between the pair of two-way steering cylinders if the pair of two-way steering cylinders are not synchronized together in a fully retracted position while the steering wheel is turned fully in an opposite direction.

12. The synchronizing system for hydraulic four wheel steering of claim 11 wherein the pair of directional relief valves are in a synchronizing valve assembly having a manifold with passages extending between a plurality of ports.

13. The synchronizing system for hydraulic four wheel steering of claim 11 wherein the hydraulic lines connect a bore of one of the two-way steering cylinders to an annulus of the other of the two-way steering cylinders.

14. The synchronizing system for hydraulic four wheel steering of claim 11 wherein the hydraulic lines form a loop including the power steering valve, the pump, and the pair of two-way steering cylinders if the pair of directional relief valves are closed.

* * * * *